(12) United States Patent
Hernandez et al.

(10) Patent No.: US 9,903,109 B2
(45) Date of Patent: Feb. 27, 2018

(54) THERMAL AND/OR ACOUSTIC INSULATION MATERIALS SHAPED FROM SILICA

(71) Applicant: RHODIA OPERATIONS, Aubervilliers (FR)

(72) Inventors: Julien Hernandez, Antony (FR); Catherine Enjalbert, Saint-Leu-la-Foret (FR)

(73) Assignee: Rhodia Chimie, Paris (FR)

( * ) Notice: Subject to any disclaimer, the term of this patent is extended or adjusted under 35 U.S.C. 154(b) by 0 days.

(21) Appl. No.: 14/834,044

(22) Filed: Aug. 24, 2015

(65) Prior Publication Data

US 2015/0361652 A1    Dec. 17, 2015

Related U.S. Application Data

(63) Continuation of application No. 10/562,908, filed as application No. PCT/FR2004/001669 on Jun. 29, 2004, now abandoned.

(30) Foreign Application Priority Data

Jun. 30, 2003  (FR) .................................... 03 07903

(51) Int. Cl.
E04B 1/74        (2006.01)
C04B 30/02       (2006.01)

(52) U.S. Cl.
CPC ................ *E04B 1/74* (2013.01); *C04B 30/02* (2013.01)

(58) Field of Classification Search
CPC ... C04B 30/02; C04B 14/062; C04B 20/0048; C04B 2103/56; C04B 40/006; C04B 40/0071; E04B 1/74
See application file for complete search history.

(56) References Cited

U.S. PATENT DOCUMENTS

| 3,500,444 | A  | 3/1970  | Hesse et al. |
| 3,753,751 | A  | 8/1973  | Shannon |
| 4,590,052 | A  | 5/1986  | Chevallier et al. |
| 4,636,415 | A  | 1/1987  | Barito et al. |
| 4,719,336 | A  | 1/1988  | Sterwald |
| 6,468,493 | B1 | 10/2002 | Chevallier et al. |

FOREIGN PATENT DOCUMENTS

EP       0594469    *  4/1994  ........... C04B 14/062

* cited by examiner

*Primary Examiner* — Shuangyi Abu Ali

(57) ABSTRACT

Thermal and/or acoustic insulation materials based on dried precipitated silica, having a total pore volume of from 1 to 5 cm3/g and optionally containing reinforcing fillers and/or opacifying agents, are prepared by:
 (A) filtering an aqueous dispersion D containing precipitated silica particles in a filter press, whereby a compacted filter cake is obtained; and then
 (B) drying the filter cake in the compacted state as obtained after step (A).

17 Claims, No Drawings

THERMAL AND/OR ACOUSTIC INSULATION MATERIALS SHAPED FROM SILICA

CROSS-REFERENCE TO EARLIER APPLICATIONS

This application a continuation of U.S. application Ser. No. 10/562,908, filed Jul. 26, 2006, which is a U.S. national stage entry under 35 U.S.C. § 371 of International Application No. PCT/FR2004/001669, filed Jun. 29, 2004, which in turn claims priority to French Application No. FR 0307903, filed Jun. 30, 2003. The entire contents of these applications are explicitly incorporated herein by this reference.

The present invention relates to porous materials based on dried silica, generally in the form of panels, which are particularly suitable as thermal and/or acoustic insulation materials. The invention also relates to a method of obtaining these insulation materials.

Many types of materials intended to provide thermal and/or acoustic insulation are known at the present time. These materials, which usually take the form of panels of rectangular or square shape, are in particular used in the field of the construction of buildings and dwellings, in which they are in particular employed for thermally insulating and/or soundproofing the walls and ceilings.

Usually, these panels exhibiting a thermal-insulation and/or soundproofing effect are materials based on a porous agglomerate of finely divided particles, essentially containing particles having a low thermal conductivity, such as, for example carbon black, calcium sulfate, calcium carbonate, pyrogenic silica and/or precipitated silica particles in powder form.

Especially for the purpose of ensuring that these insulating panels have sufficient mechanical strength, especially making it practical to handle them, it is conventional to incorporate reinforcing fillers, such as fibrous materials, into their structure.

Another more specific use of thermally insulating panels is for the thermal insulation of enclosures heated to high temperature, such as industrial thermal enclosures (furnaces or ovens for example) or thermal enclosures of the household type (such as pyrolitic ovens in particular). Another application of thermal insulation panels within this context is the manufacture of fire doors or site walls intended in particular for limiting the propagation of the onset of fires or for bringing fires under control.

In these particular applications, the material is in general subjected to temperatures that can vary widely, such as for example to temperature cycles in which the temperature rises and falls within a furnace or oven. These thermal variations have a tendency to induce expansion and contraction phenomena within the material, which may be unacceptable in certain applications and also usually result in high mechanical stresses liable to weaken the structure of the material over the relatively long term. In general, incorporating reinforcing fillers limits these phenomena, but this does not always prove to be sufficient for inhibiting them and for ensuring satisfactory mechanical integrity of the material.

In addition, within the context of the thermal insulation of enclosures heated to high temperature, particularly pronounced thermal insulation properties are in general required. To obtain insulating panels having thermal insulation properties suitable for this type of use, it is recommended in general to introduce into their structure agents called "opacifying agents" such as for example titanium dioxide particles. These opacifying agents reflect, absorb and/or disperse at least part of the infrared radiation and thus consolidate the thermal barrier effect of the material. Even so, it turns out that the mere presence of these opacifying agents does not always make it possible to obtain optimum thermal insulation properties.

A conventional method for preparing the aforementioned thermal and/or acoustic insulation panels consists in carrying out a dry compacting operation of their constituents, namely by applying pressure to the particles of low thermal conductivity, generally in combination with reinforcing fillers, and optionally opacifying agents. This method is in general carried out by introducing these constituents in the form of a blend of finely divided particles and/or powders in a porous envelope, for example a bag or a cushion made of glass fabric and then applying a high pressure (typically of about 10 bar or more) to said envelope, in order to bond the particles together, so as to obtain a compressed material having a certain mechanical integrity.

The panels obtained according to this dry compacting method usually have insufficient physical and/or mechanical properties. Thus, the thermal and acoustic insulation properties of the materials often prove to be bad, in particular when the low thermal conductivity particles involved in their structure are carbon black, calcium sulfate or calcium carbonate particles. More acceptable insulation properties may be obtained by using silica particles. However, with these particles, materials having insufficient mechanical properties are obtained, said materials being in particular friable and inclined to cracking.

To solve this problem, and to obtain materials having both good mechanical integrity and useful thermal and acoustic insulation properties, methods have been developed wherein, instead of dry compressing the constituents, one dries an aqueous slurry containing silica particles and optionally additives. Especially, Patent EP 0 594 469 describes a method of preparing insulating panels based on dried silica, which consists in drying an aqueous composition obtained by blending a pulverized cake of precipitated silica to which at least one reinforcing filler, and optionally an opacifying agent, have been added. The materials obtained according to the method of EP 0 594 469 exhibit satisfactory mechanical integrity, combined with thermal and acoustic properties at least similar to those of the materials obtained by dry compacting, and usually superior to them. In this regard, it seems reasonable to suppose that the operation of drying an aqueous slurry instead of a dry compacting operation makes it especially possible to increase the pore volume of the material obtained in fine. The method of EP 0 594 469 also proves to be economically more advantageous than dry compacting, especially insofar as it obviates the expensive and burdensome phases of blending powders and compacting them at high pressure.

In the methods for preparing insulating panels based on dried silica of the type of those described in EP 0 594 469, the aqueous composition which undergoes the drying operation is in general a slurry with a solids content of at least 10%, which is fluidized (disintegrated) before being introduced into a mold, and then dried.

Now, the inventors have discovered that it is possible to further improve the properties of the insulation materials which are obtained by drying aqueous compositions based on precipitated silica particles, by carrying out the drying operation on a precompacted aqueous composition, e.g. a cake obtained by filtering a precipitated silica dispersion in a filter press.

Within this context, the work carried out by the inventors has more specifically demonstrated that it is actually more advantageous to carry out a drying step on a cake obtained by filtering an aqueous dispersion of precipitated silica particles in a filter press, rather than on a cake subjected to a subsequent fluidization step, as carried out in the method of EP 0 954 469.

In other words, the inventors have surprisingly discovered that it is possible to improve the method of EP 0 594 469, especially by avoiding one of the steps of this method, thereby making it possible to produce more advantageous materials by means of a less expensive method. In addition, by carrying out the drying directly on a compacted silica cake obtained from a filter press, the use of a mold is no longer necessary for the drying step insofar as the compacted cake is already formed in the filter press. This further reduces the production costs of the material.

Without being tied down to any specific theory, it seems plausible that a drying operation carried out on a compacted aqueous composition, instead of on a pulverized composition as used in EP 0 594 469, makes it especially possible to reduce the size of the pores present in the material, in general without important reduction of the total pore volume, which especially enhances the thermal and acoustic insulation properties.

The materials obtained by the inventors are moreover particularly suitable for use in a vacuum, in which they especially exhibit good mechanical integrity and useful thermal insulation properties.

On the basis of the various elements above, the present invention aims to provide a method of preparing insulating materials of the dried-silica panel type having mechanical integrity and thermal and/or acoustic insulation properties at least similar, and preferably superior, to those of currently known silica panels, and to attend this aim with a lower production cost than with the methods of the prior art.

An object of the invention is further to provide novel materials based on dried silica that are suitable for thermal and/or acoustic insulation, and preferably suitable for thermal insulation at high temperature. Within this context, the aim of the invention is in particular to provide such materials in the form of dried-silica panels having in particular sufficient mechanical integrity to allow them to be handled. The aim of the invention is also specifically to provide such materials that are suitable for vacuum processing, especially in order to produce vacuum thermal insulation.

Thus, according to a first aspect, the subject of the present invention is a method of preparing a thermal and/or acoustic insulation material based on dried precipitated silica, comprising the steps consisting in:
(A) filtering an aqueous dispersion D containing precipitated silica particles in a filter press, whereby a compacted filter cake is obtained; and then
(B) drying the filter cake in the compacted state as obtained after step (A).

The expression "thermal and/or acoustic insulation material" is understood to mean, within the context of the present invention, a porous solid having sufficient mechanical strength for it to be able to be handled, and possessing absorption, reflection and/or dispersion properties for thermal radiation and/or acoustic waves.

Advantageously, the thermal and/or acoustic insulation material prepared according to the invention takes the form of a particulate panel, preferably of rectangular or square shape. In the method of the invention, the drying of step (B) consists in substantially removing the water contained in the compacted cake obtained from step (A), optionally after demolding the compacted cake obtained in the filter press. Insofar as this compacted cake is dried in this state, step (B) generally results essentially in the formation of a one-piece solid, the shape of which is determined by the filter press used in step (A), which acts as a mold for the compacted cake produced.

Consequently, when it is desired to obtain an insulation panel of given shape, it is usually advantageous to carry out step (A) within a filter press having said shape, for example in a filter press having a rectangular or square shape.

Alternatively, the compacted cake obtained in step (A) may, in certain cases, be demolded from the filter press and then cut up into the desired shape, prior to the drying of step (B). In this case, it is necessary however, to modify as little as possible the state of compaction of the cake produced in step (A). To do this, the cutting-up operation should in particular be carried out with the least possible vibration.

Whatever the shape of the insulation material prepared, one of the essential steps of the method of the invention is step (A), whose purpose is to form a compacted filter cake. The work carried out by the inventors seems to indicate that, the greater the compacting of the cake produced in step (A), the greater the reduction observed in the size of the pores present in the material obtained after the drying of step (B), thereby improving the insulation properties. However, excessive compacting results, on the contrary, in a material having a low pore volume, which is prejudicial to the insulation properties. Therefore, in the general case, it is necessary to carry out the compacting of the cake from step (A) under moderate pressure. Thus, the filtration in the filter press of step (A) preferably includes a compacting operation with a pressure of between 2 and 10 bar (that is to say between $2 \times 10^5$ Pa and $10 \times 10^5$ Pa). Advantageously, the pressure employed is 3 bar or higher, and more preferably 4 bar or higher. Moreover, in particular to minimize the reduction in pore volume of the material obtained in fine, it often proves advantageous for this pressure to be 8 bar or less, preferably 7 bar or less, and more preferably less than 6 bar. Particularly advantageously, the pressure at which the compacting of step (A) is carried out is thus between 2 and 7 bar and preferably between 4.5 and 5.5 bar (typically around 5 bar).

Generally, the compacted filter cake obtained after step (A) has a solids content of at least 10% by weight and preferably at least 15% by weight, this content generally remaining less than 35% by weight. Usually, it is preferred for this solids content to be between and 30% (typically around 25%). To do this, the pressure filtration of step (A) is generally carried out for a time of at least 10 minutes, typically between 10 and 40 minutes, and preferably for at least 20 minutes, especially so as to establish the optimum porosity within the material.

According to an advantageous embodiment, the pressure filtration of step (A) comprises two successive steps, namely:
(A1) a filtration under moderate pressure (for example between 0.5 bar and 2 bar, and typically at a pressure of around 1 bar), in general carried out for a time of 5 to 10 minutes; and then
(A2) compacting of the filter cake obtained at a higher pressure than that of step (A1) (generally between 2 and 10 bar, preferably between 3 and 8 bar, advantageously at a pressure of around 5 bar, especially between 4 and 6 bar), in general for a time of at least 2 minutes (see example 1) and usually for 5 to 30 minutes, and advantageously for at least 15 minutes).

As a general rule, the implementation of aforementioned steps (A1) and (A2) makes it possible in particular to reduce the risk of cracks forming during the subsequent drying step (B).

Whatever the precise method of implementing step (A), this step is in general carried out at room temperature (typically at a temperature between 10 and 30° C.) However, according to certain methods of implementation, higher temperatures may be envisaged, (especially temperatures between 30 and 80° C.), for example in order to increase the filtration rate.

The aqueous precipitated-silica-based dispersion D subjected to the filtration of step (A) in a filter press may in general be any dispersion based on precipitated silica particles. The term "precipitated silica" denotes, within the context of the present description, any silica obtained by the reaction of a silicate with an acid, according to any method of preparation, especially by the addition of an acid to a silicate stock, or else by simultaneous, total or partial, addition of acid and silicate to a water or silicate stock. In general, the suspension D is a silica slurry such as that obtained after such reactions, to which various additives may optionally be added.

Preferably, the precipitated silica present in the aqueous dispersion D is a precipitated silica which, once dried, has a BET specific surface area of between 80 and 400 $m^2/g$, and preferably between 100 and 350 $m^2/g$ and a CETAB specific surface area of between 80 and 350 $m^2/g$, and preferably between 100 and 250 $m^2/g$.

As examples of precipitated silicas that are particularly suitable for implementing the method of the invention, mention may particularly be made of the precipitated silicas obtained by the methods described for example in EP 0 520 862, WO 95/09127, WO 95/09128, or WO 03/016215.

The initial solids content of the suspension D that is subjected to the pressure filtration of step (A) may vary quite widely. However, it is preferable for this initial solids content before filtration to be between and 30%, and preferably between 15 and 25% by weight. Preferably, the precipitated silica in the aqueous dispersion D is the predominant solid compound. Thus, it is preferable for the precipitated silica in the dispersion D to be present in an amount of at least 50% by weight, preferably at least 75% by weight relative to the total mass of solids of the dispersion D.

Usually, the aqueous dispersion D used in step (A) contains, in addition to the precipitated silica, a reinforcing filler. In general, this filler is intended to increase the mechanical integrity of the insulation panel obtained by the method. Where appropriate, this reinforcing filler preferably contains reinforcing fibers chosen from the group formed by aluminum silicate fibers, alumina fibers, mineral wool fibers, glass fibers, quartz fibers, ceramic fibers, polymer fibers and cellulose fibers, said reinforcing fibers preferably being glass fibers or polymer fibers, such as polyamide fibers.

Whatever the nature of the reinforcing filler used, it is preferred, when such a filler is present, for the (silica/reinforcing filler) mass ratio in the aqueous dispersion D of step (A) to be between 75/25 and 99/1, and preferably between 85/15 and 98/2.

Especially when it is desired to prepare materials suitable for high-temperature thermal insulation, the aqueous dispersion D used in step (A) may contain, in addition to precipitated silica and an optional reinforcing filler, an opacifying agent, namely a compound capable of reflecting, absorbing and/or dispersing at least part of the infrared radiation. Where appropriate, this opacifying agent acting as an infrared barrier is advantageously chosen from the group consisting of chromium oxide, zirconium oxide, iron oxide, titanium dioxide, manganese dioxide, ilmenite, quartz powder, silicon carbide, boron carbide, tantalum carbide, carbon black and graphite, in general in particulate form. The titanium dioxide and ore particles that it comprises, in particular the ilmenite particles, constitute particularly suitable opacifying agents within the context of the present invention.

When an opacifying agent is present in the dispersion D used in step (A), it is in general preferred for the (silica/opacifying agent) mass ratio within the aqueous dispersion D to be between 50/50 and 99/1, and preferably between 70/30 and 90/10.

Whatever the precise composition of the dispersion D, step (A) consists in carrying out a pressure filtration operation on this dispersion, so as to obtain a compacted cake whose solid phase has substantially the same composition as the solid phase of the suspension D.

Especially when the suspension D contains dissolved compounds (such as acids or salts resulting from the silica precipitation reaction for example), it may prove beneficial for step (A) to include one or more washing operations (using water or solvents). Where appropriate, the washing operation(s) must however be carried out taking care not to obtain a pulverized cake after step (A). This is because, characteristically, step (B) of the method of the invention must be carried out on a filter cake in the compacted state. Thus, when washing steps are carried out, it is in general preferable that they be carried out in the filter press, and advantageously under pressure, so as to obtain a properly compacted cake prior to drying.

The drying step (B) of the method of the present invention generally consists in substantially removing the water present in the compacted cake obtained from step (A), in general so as to obtain a water content in the material of 15% or less, and typically between 1 and 10% by weight. In general, this drying is carried out slowly, especially so as to optimize the cohesion of the various particles and to avoid the formation of cracks, which would be liable to affect the insulating properties of the material, or even its mechanical strength.

The drying of step (B) may be carried out by leaving the compacted cake obtained after step (A) in the filter press used for the filtration. However, the compacted cake obtained after step (A) is in general sufficiently compacted for it to be possible to demold it from the filter press without appreciably affecting its compacted character.

When it is desired to demold the compacted cake from step (A) prior to the drying of step (B), it is in general advantageous to coat the internal surface of the filter press with a mold-release agent such as, for example, an organic oil or a silicone oil, prior to the pressure filtration of step (A). The presence of such a mold-release agent allows the compacted cake to be demolded even more easily, and therefore its state of compaction prior to drying to be disturbed even less.

According to a first embodiment, step (B) of the method of the invention is carried out by leaving the compacted filter cake obtained after step (A) to dry at room temperature, namely at a temperature between 10 and 30° C., preferably between 15 and 25° C. Depending on the initial water content of the compacted cake and on its composition, the evaporation time may vary widely according to this first embodiment. However, usually a drying operation lasts around 10 to 20 days, or even a shorter time.

According to another embodiment, step (B) is carried out by subjecting the compacted filter cake as obtained after step (A) to a progressive temperature rise, generally from room temperature (typically 20° C.) up to a temperature of at least 100° C., or even up to a temperature of at least 200° C., with the slowest possible rate of temperature rise, preferably less than 2° per minute, and typically not exceeding 0.5° C. per minute. Preferably, when a progressive temperature rise is employed, it proves to be advantageous to hold the temperature at one, two or three intermediate temperature levels. Usually, step (B) may be carried out under the drying conditions described in Patent EP 0 594 469. Moreover, it is often advantageous, especially so as to limit the risk of cracks forming, for step (B) to be carried out by controlling the ambient humidity during the drying operation.

According to another aspect, the subject of the present invention is porous thermal and/or acoustic insulation materials based on dried precipitated silica, which can be obtained by the method described above. These materials usually take the form of panels, generally of rectangular or square shape.

These materials are especially different from the currently known thermal and/or acoustic insulation materials by a particular porosity which gives them particularly pronounced insulating properties, and in particular advantageous thermal insulation properties.

As a general rule, the materials according to the present invention have a porous structure with a small pore size. The "pore size" referred to here is the pore size as determined using the mercury porosimetry method, for example by means of a porosimeter of the Micromeritics Autopore III 9420 type. In the mercury porosimetry method, the porous specimens tested are prepared as follows: the specimen is dried for two hours in an oven at 200° C. and then placed in a test vessel within 5 minutes following its removal from the oven, and then vacuum-degassed, for example using a rotary vane pump; the pore diameters are calculated by the Washburn equation with a contact angle θ of 140° and a surface tension γ of 484 N/m (or dynes/cm).

Mercury porosity measurements using the above method demonstrate that, in an insulation material according to the invention, a high proportion of the pores present are pores having a size of less than 1000 nm.

Thus, as a general rule, it is found, by mercury porosimetry measurements, that, in a material according to the invention, the pore volume of the pores smaller in size than 1000 nm represents at least 40%, and usually at least 50%, of the total pore volume of the material. In most cases, in the materials obtained according to the method of the present invention, the pore volume of the pores smaller in size than 1000 nm represents at least 60%, or even at least 70%, of the total pore volume.

Furthermore, it is usually observed that, among the pores smaller in size than 1000 nm present in a material according to the invention, the pores smaller in size than 100 nm are predominant. Thus, mercury porosimetry shows that the pore volume of the pores smaller in size than 100 nm represents at least 50%, in general at least 60%, and advantageously at least 70% of the pore volume of pores smaller in size than 1000 nm. As a general rule, this proportion of pores smaller in size than 100 nm is higher the greater the pressure at which the filtration of step (A) is carried out.

In addition to the aforementioned relatively small pore sizes, a material according to the present invention generally possesses a relatively high total pore volume. The term "pore volume" is understood here to mean the volume of the accessible pores of the material, as determined by the aforementioned mercury porosimetry method. This total pore volume is generally between 1 and 5 cm$^3$/g (between 1 and 5 ml/g), and usually between 1.2 and 4 cm$^3$/g, this total pore volume preferably being greater than 1.5 cm$^3$/g, advantageously at least 2 cm$^3$/g and even at least 2.5 cm$^3$/g. In general, the pore volume of the pores smaller in size than 100 nm is itself at least 1 cm$^3$/g, usually at least 1.1 cm$^3$/g and preferably at least 1 cm$^3$/g.

Materials having large pore volumes are in general obtained when the pressure at which the filtration of step (A) is carried out is relatively low, typically when this pressure is around 5 bar or less (for example between 2 and 5.5 bar). However, so as to obtain materials with a high pore volume, it is usually necessary to carry out step (A) at a high pressure, advantageously at least equal to 3 bar, preferably 4 bar, especially so as to obtain the highest possible mechanical strength of the material.

If it is obtained by drying the filter cake obtained by filtration of the dispersion D carried out in step (A), an insulation material according to the invention generally has a composition extremely similar, and usually identical, to that of the solid phase of the aqueous dispersion D. Thus, in general a material according to the invention consists predominantly of dried precipitated silica, that is to say with a content of at least 50% by weight, preferably at least 75% by weight and advantageously at least 80% by weight relative to the total weight of the material.

Depending on the nature of the dispersion D used in its method of formation, a material according to the invention may also include other elements than dried silica, and in particular additives such as a reinforcing filler and/or an opacifying agent.

According to one advantageous embodiment, a material according to the invention is a material obtained from a dispersion D comprising, in addition to precipitated silica, a reinforcing filler. In general, such a material comprises:
  from 75 to 99% by weight, and preferably 85 to 98% by weight, of dry silica; and
  from 1 to 25% by weight and preferably 1.5 to 10% by weight of reinforcing filler.

A material according to this embodiment is particularly suitable as a thermal and acoustic insulation material for walls or ceilings of buildings or dwellings. Its thermal insulation properties also make it suitable as a fire-stop material.

In another embodiment, a material according to the invention is a material obtained from a dispersion D comprising, in addition to precipitated silica, an opacifying agent, and optionally a reinforcing filler.

In general, such a material comprises:
  from 50 to 90% by weight, and preferably 65 to 75% by weight, of dry silica;
  from 9 to 50%, and preferably 20 to 30%, by weight of an opacifying agent; and
  from 0 to 15% by weight, preferably at least 0.5% by weight and advantageously between 1 and 10% by weight of reinforcing filler.

A material according to this specific embodiment is particularly intended for producing a high-temperature thermal insulation, in particular for the insulation of enclosures heated to high temperatures, or as constituent materials of fire-stop barriers. These materials are also suitable for the more usual uses of thermal and acoustic insulation, such as the insulation of walls and ceilings.

More generally, the materials obtained according to the method of the invention prove to be useful as thermal and/or acoustic insulation material, and in particular for thermal insulation under reduced pressure.

This general use of the materials according to the invention and also the various particular uses of the aforementioned specific materials constitute another subject of the present invention.

Various features and advantages of the invention will become even more clearly apparent in the light of the illustrative examples given below.

EXAMPLE 1: MANUFACTURE OF AN INSULATING SILICA PANEL

Introduced into a 25 liter stainless steel reactor were 6.7 l of an aqueous sodium silicate solution having an $SiO_2$/$Na_2O$ mass ratio ($R_w$) of 3.48 and an $SiO_2$ concentration of 5 g/l. The solution was then stirred and heated to 80° C. While keeping the temperature at 80° C., an aqueous sulfuric acid solution with a concentration of 80 g/l was added until the pH of the mixture reached a value of 4.

While still keeping the mixture at 80° C., the following were introduced simultaneously into the reactor:
- an aqueous sodium silicate solution (S1) having a concentration of 230 g/l and an $R_w$ of 3.48, with a flow rate of 50 g/minute; and
- an aqueous sulfuric acid solution (S2) of 80 g/l concentration, with a regulated flow rate so as to keep the pH reaction mixture at a value of 4 over the entire duration of simultaneous addition of the sodium silicate and the sulfuric acid.

The simultaneous addition of the solutions (S1) and (S2) under the aforementioned conditions was carried out over 80 minutes.

After 80 minutes of simultaneous addition, the introduction of the solution S2 was stopped and the introduction of the solution (S1) was continued until the pH of the mixture reached a value of 8.

Once the pH reached 8, a further combined addition of the solutions (S1) and (S2) was carried out over 20 minutes, again with a flow rate of the solution S1 of 50 g/minute and a flow rate of the solution (S2) regulated so as to keep the pH of the reaction mixture constantly at a value of 8 throughout the duration of this second simultaneous addition.

After this second simultaneous addition for 20 minutes, the addition of the solution (S1) was stopped and the reaction mixture brought to a pH of 4 by the addition of sulfuric acid solution (S2). During all these steps, the mixture was kept at a temperature of 80° C.

After these various reactions, a reaction slurry was obtained, from which 250 ml samples were taken.

Added to these 250 ml reaction slurry samples, with stirring, were 2 ml of an FA10 solution (polyoxyethylene with a molecular weight of $5 \times 10^6$ mol/g) with a concentration of 1% by weight. The mixture obtained was introduced into a filter press with an inside diameter of 7 cm. A pressure of 1 bar was applied so as to carry out a first operation to remove the water contained in the reaction slurry. A cake was thus obtained which was then washed twice with 150 ml of demineralized water with a pressure exerted during the washing of 1 bar. After these washing steps (carried out in the filter press), the pressure of the filter press was increased to 5 bar and this pressure was maintained for 2 minutes. A silica cake characterized by a solids content of 22% by weight was thus obtained. This concentrated cake was demolded from the filter press and left to dry. The cake thus formed was left to dry at room temperature and demolded.

After 15 days, a dried cake having a solids content of 95% was obtained, this cake constituting a silica panel having the following characteristics:
- density: 0.27;
- total pore volume: 3.63 $cm^3$/g with the following pore distribution:
  - pores with a size of greater than 100 nm: 31%
  - pores with a size of between 100 and 1000 nm: 29%
  - pores with a size of less than 100 nm: 40%.

EXAMPLE 2: PREPARATION OF AN INSULATING SILICA PANEL

A silica cake was produced according to the method described in example 1 of EP 520 862. The cake, as obtained after the filtration step in a filter press, which had a solids content of 21%, was diluted with water so as to obtain a silica suspension or slurry having a solids content of 13.5% by weight, and the pH of this silica suspension was increased to 5 by the addition of sulfuric acid (80 g/l aqueous solution).

A dispersion of 1 g of polyamide fibers, with a mean length of 4 mm and a mean diameter of 200 microns, was added, with stirring, to 100 g of the silica suspension prepared beforehand (with a solids content of 13.5% by weight and a pH of 5).

The mixture obtained was then filtered in the filter press used in Example 1 above (filter press with an inside diameter of 7 cm). A compacting pressure of 5 bar was applied, after which a compacted cake having a solids content of 27% by weight was obtained. The formed cake thus obtained was demolded and left to dry at room temperature as in the previous example. After 10 days, a dried cake with a solids content of 95% was obtained. Thus, a silica panel having a good mechanical strength and a density of 0.4 was obtained.

The silica panel obtained had a total pore volume of 3.3 ml/g, with a pore volume of pores smaller in size than 100 nm of 1.2 ml/g.

EXAMPLE 3: THERMAL CONDUCTIVITY MEASUREMENTS

Thermal conductivity measurements were carried out using a TC-meter on the two silica panels of Examples 1 and 2. The principle used was that called the "thermal shock probe", which is similar to the method used according to the ISO 8814-1 standard.

More precisely, the thermal conductivity coefficient of the silica panels of Examples 1 and 2 was measured at various pressures in the following manner: a thermal probe was placed within the material to be characterized.

After having thermally stabilized the mixture to room temperature (20° C.), the thermal equilibrium of the material was disturbed by generating a heat flux by means of the heating element of the probe.

Using a temperature sensor integrated into the probe introduced into the material, the temperature behavior of the material was recorded. A temperature behavior corresponding to an equation of the type $T(t) = Q/(4\pi\lambda) \times (\ln(t) + A)$ was observed, in which:
- T denotes the temperature in ° C. recorded by the temperature sensor;
- t represents the time in seconds;
- Q represents the heat flux in W/m;
- $\lambda$ denotes the thermal conductivity of the material in W/m/K; and
- A represents a constant.

By linear regression, the thermal conductivity of the material was determined at various pressures.

The measurements were carried out on each of the materials at increasing pressure, with 5 different pressures ranging from 0.03 mbar (3 Pa) up to atmospheric pressure.

The results obtained are given in Tables 1 and 2 below.

TABLE 1

Measurement of the thermal conductivity of the material of Example 1

| Pressure (Pa) | Thermal conductivity (mW/m/K) |
|---|---|
| 3 | 14.6 |
| 100 | 16.0 |
| 1010 | 1.1 |
| 20600 | 32.3 |
| 99600 | 38.8 |

TABLE 2

Measurement of the thermal conductivity of the material of Example 2

| Pressure (Pa) | Thermal conductivity (mW/m/K) |
|---|---|
| 3 | 12.7 |
| 100 | 22.3 |
| 1000 | 31.5 |
| 23200 | 39.4 |
| 99500 | 45.4 |

The invention claimed is:

1. A method of preparing a thermal and/or acoustic insulation material based on dried precipitated silica, comprising:
   (A) filtering an aqueous dispersion D containing precipitated silica particles in a filter press, whereby a compacted filter cake is obtained by a compacting operation performed at a pressure of about 7 bar or less; and
   (B) drying the filter cake in the compacted state as obtained after step (A) wherein the thermal and/or acoustic insulation material has a content of dried precipitated silica comprising at least 50% by weight of the insulation material and wherein the thermal and/or acoustic insulation material has a total pore volume of between 1 cm$^3$/g and 5 cm$^3$/g, at least 40% of the total pore volume consists of pores smaller than 1,000 nm and at least 50% of the pore volume of pores smaller than 1,000 nm consists of pores smaller than 100 nm.

2. The method of claim 1, wherein the compacting operation is performed at a pressure of between about 2 and about 7 bar.

3. The method of claim 1, wherein step (A) comprises:
   (A1) a filtration operation at a pressure of about 0.5 to about 2 bar; and
   (A2) the compacting operation carried out on the filter cake obtained at a pressure of between about 2 and about 7 bar.

4. The method of claim 1, wherein the compacted filter cake obtained after step (A) has a solids content of between 10 and 35% by weight.

5. The method of claim 1, wherein the aqueous dispersion D used in step (A) contains a precipitated silica which, once dried, has a BET specific surface area of between 80 and 400 m$^2$/g and a CTAB specific surface area of between 80 and 350 m$^2$/g.

6. The method of claim 1, wherein the aqueous dispersion D used in step (A) further contains a reinforcing filler.

7. The method of claim 6, wherein said reinforcing filler comprises reinforcing fibers selected from aluminum silicate fibers, alumina fibers, mineral wool fibers, glass fibers, quartz fibers, ceramic fibers, polymer fibers and cellulose fibers.

8. The method of claim 6, wherein the (silica/reinforcing filler) mass ratio within the aqueous dispersion D is between 75/25 and 99/1 by weight.

9. The method of claim 1, wherein the aqueous dispersion D used in step (A) further contains an opacifying agent capable of reflecting, absorbing and/or dispersing at least part of the infrared radiation.

10. The method of claim 9, wherein the opacifying agent is selected from the group consisting of chromium oxide, zirconium oxide, iron oxide, titanium dioxide, manganese dioxide, ilmenite, quartz powder, silicon carbide, boron carbide, tantalum carbide, carbon black and graphite.

11. The method of claim 9, wherein the (silica/opacifying agent) mass ratio is between 50/50 and 99/1 within the aqueous dispersion D.

12. The method of claim 1, wherein step (B) is carried out by allowing the compacted filter cake obtained after step (A) to dry at a temperature of between 10 and 30° C.

13. The method of claim 1, wherein step (B) is carried out by subjecting the compacted filter cake obtained after step (A) to a progressive temperature rise from room temperature up to a temperature of at least 100° C., at a rate of temperature rise of less than 2° C. per minute, optionally with the temperature being held at one, two or more intermediate temperature levels.

14. The method of claim 1, wherein the pressure in step (A) is less than about 6 bar.

15. The method of claim 1, wherein the insulation material comprises at least 75% by weight of the dried filter cake.

16. The method of claim 1, wherein the insulation material has a total pore volume of at least 2.0 cm$^3$/g, and wherein at least 70% of the total pore volume consists of pores smaller than 1,000 nm.

17. The method of claim 1, wherein at least 70% of the pore volume of pores smaller than 1,000 nm consists of pores smaller than 100 nm.

* * * * *